E. W. BURGESS.
TRACTION ENGINE.
APPLICATION FILED DEC. 8, 1915.

1,310,604.

Patented July 22, 1919.
2 SHEETS—SHEET 1.

Inventor.
Edward W. Burgess.
By Chas. E. Lord
Atty.

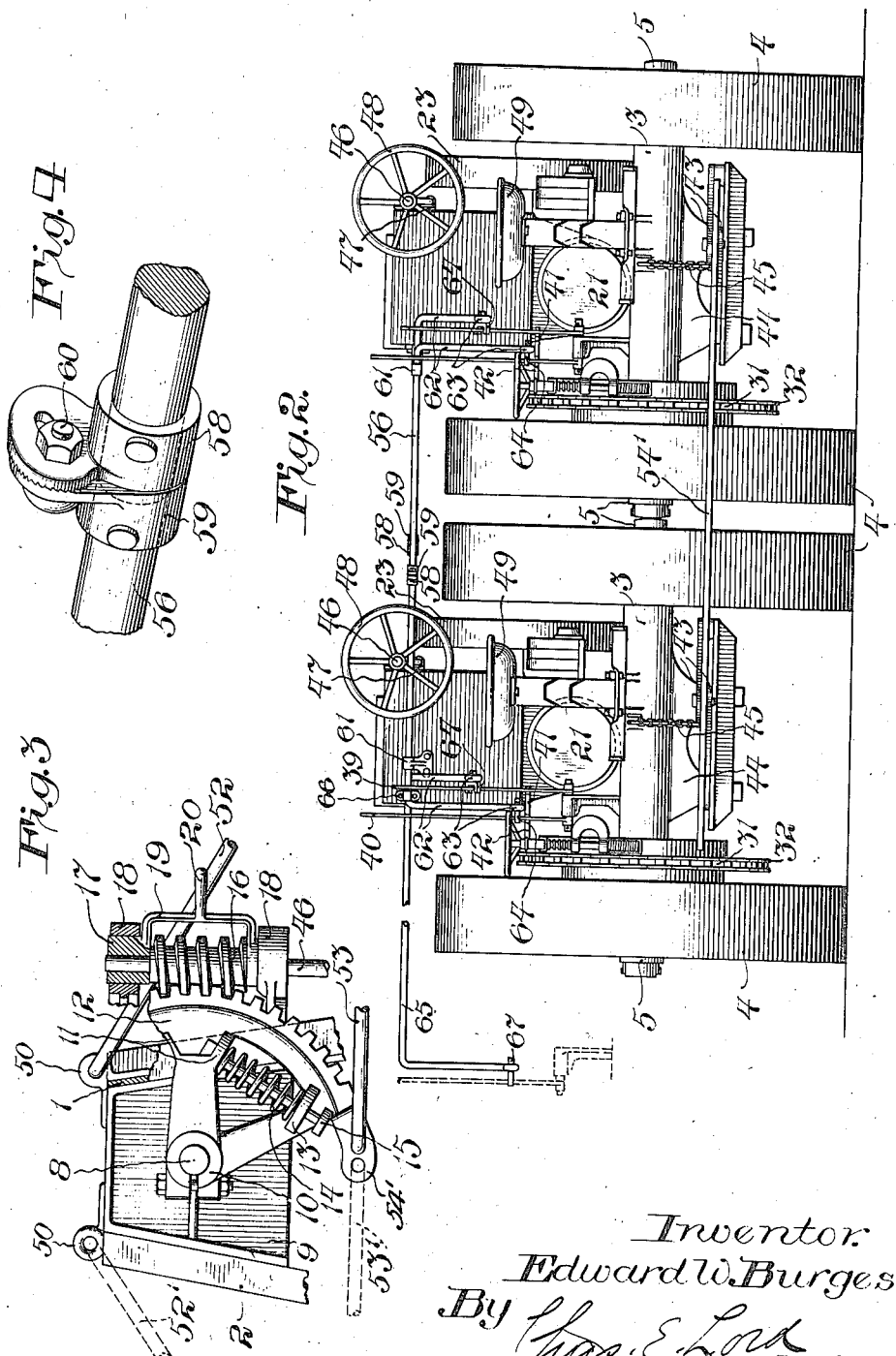

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTION-ENGINE.

1,310,604.   Specification of Letters Patent.   Patented July 22, 1919.

Application filed December 8, 1915. Serial No. 65,695.

*To all whom it may concern:*

Be it known that I, EDWARD W. BURGESS, a citizen of the United States, residing at Chicago, in the county of Cook and State of Illinois, have invented certain new and useful Improvements in Traction-Engines, of which the following is a full, clear, and exact specification.

My invention relates to traction engines, and more particularly to means whereby two or more tractor units, having substantially the same rating as to "draw bar pull," may be readily coupled together side by side in draft relation, pulling upon a common draw bar, steered by means of a single controlling element, and single operable means for manipulating the forward and reverse power transmission gear mechanism.

The object of the invention is to make available a multiple of tractive power units for heavy hauling purposes upon farms, such as plowing, disking and harrowing the soil, or other heavy duty, to provide means whereby the various operative parts of the combined units may be controlled by one operator from the seat of any selected unit, and to provide means whereby the units may be quickly separated for independent use; for example, with manure spreaders, harvesters, mowers, rakes and loaders, or belt power purposes.

These objects are attained by means of the mechanism representing an embodiment of the invention, and illustrated in the accompanying drawings, in which—

Fig. 2 is a rear end elevation of part of Fig. 1;

Fig. 3 is a detached detail on an enlarged scale of part of a unitary steering mechanism; and Fig. 4 is a detached detail of part of the means whereby the operative parts of the combined units may be controlled simultaneously by the operator.

Figure 1:
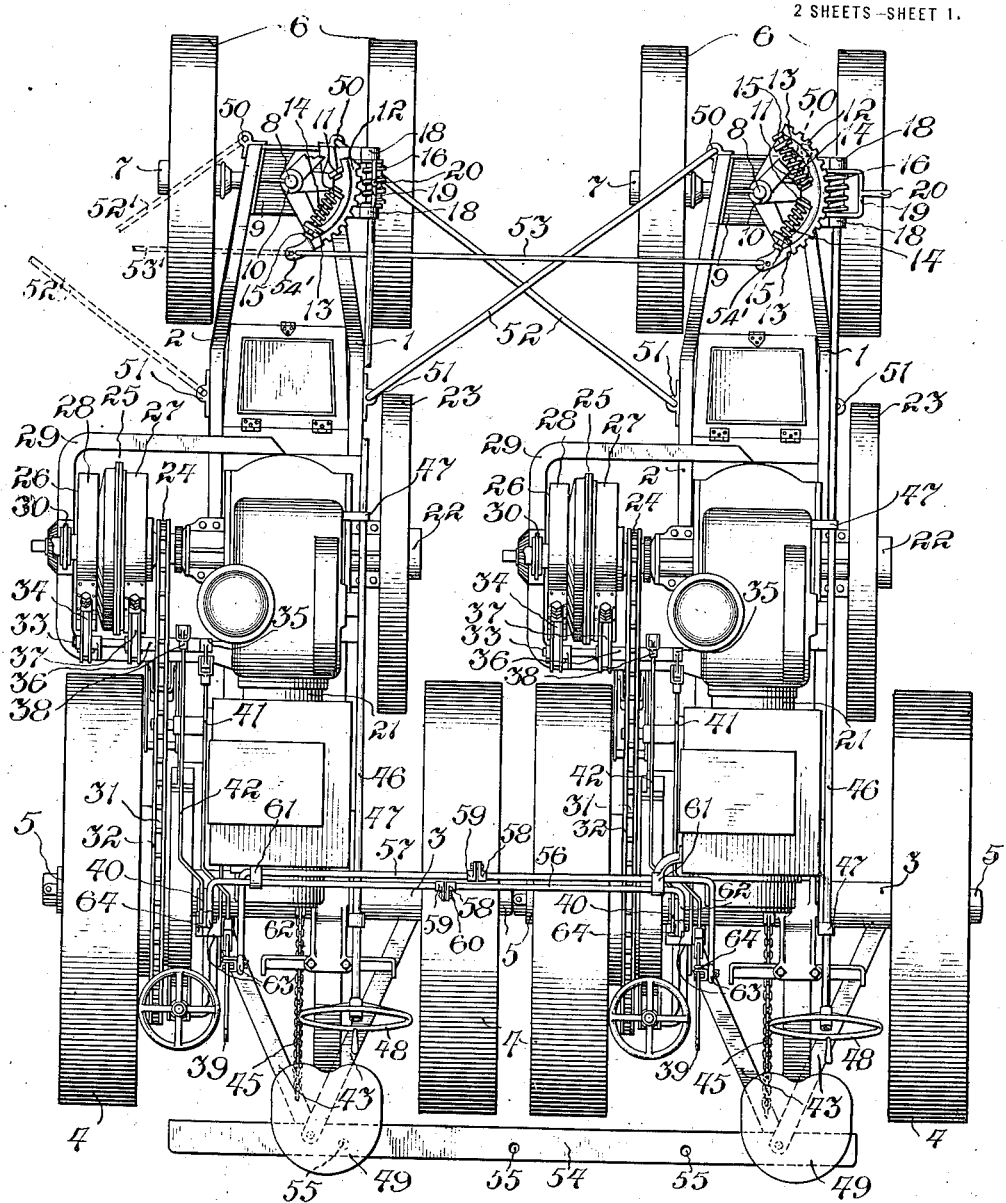
Figure 1 is a top plan view of two like tractors coupled together side by side and embodying my invention.

Referring to the drawings, wherein the same reference numerals designate like parts throughout the several views, the tractors as shown are duplicates and include right and left-hand longitudinally disposed truck frame members 1 and 2, respectively, having their rear ends connected with a transverse axle carrying member 3, 4 represents traction wheels mounted upon the axle, and 5 represents securing collars on opposite ends of the axle. The front end of the truck frame is carried by steering wheels 6 mounted upon an axle 7, having a vertically disposed stem 8 journaled in bearing blocks 9 secured to the front ends of the truck frame members. 10 represents an arm secured to the stem 8 and provided with diverging ears 11 at its free end, and 12 a worm sector journaled upon the stem 8 and provided with ear members 13 spaced apart from and disposed parallel with the ears 11. 14 represents compression springs carried by bolts 15 that are slidably received by openings in the opposing ear members and operate as yielding buffers between the worm sector 12 and arm 10. 16 represents a worm having its opposite ends journaled in eccentric bearing members 17 that are journaled in fixed bearing members 18 secured to the truck frame. The members 17 are connected by means of a yoke 19 having a hand piece 20 integral therewith whereby the eccentric bearing may be rotated axially in a manner to disengage the worm from the sector for a purpose to be further described.

The engine is mounted upon the truck frame and includes a power cylinder 21, a power shaft 22, and fly wheel 23. The power transmission gearing between the power shaft of the engine is preferably the same as that shown in my application for patent filed September 22, 1915, Serial No. 52,098, and includes a driving sprocket 24 journaled upon the power shaft 22 and operatively connected with the forward and reverse planetary gear mechanism, including the casing 25 and friction wheel 26, and 27 and 28 represent friction bands adapted to engage with the casing 25 and wheel 26, respectively. 29 represents a laterally extending U-shaped frame member carried by the truck frame and having a bearing member 30 secured thereto, in which is journaled the free end of the power shaft 22. 31 represents a driven sprocket wheel operatively connected with the driving sprocket 24 by means of a chain 32, and connected with the axle of the traction wheel by means of any preferred form of differential gear mechanism. 33 represents a transversely disposed rock shaft journaled in bearings secured to the frame member 29 and having an arm 34 secured to its outside end that is operatively connected with one end of the friction band 28, and 35 represents an arm secured to the opposite end of the shaft. 36 represents a sleeve journaled upon the shaft and integral therewith, at its outside end, is an arm 37 that is operatively connected with one end of the friction band 27, and 38 a sleeve operating arm integral with the opposite end of the sleeve. Pivotally mounted upon the rear end of the truck frame are two vertically disposed levers 39 and 40 that are operatively connected with the arms 35 and 38 by means of links 41 and 42, respectively. The lever 40 controls a forward movement of the tractor, and 39 a reverse movement thereof. 43 represents a draft bar connected with the axle carrying member 3 and supported laterally by means of a bearing 44 and vertically by means of a chain 45. 46 represents a longitudinally disposed shaft journaled in bearings 47, having its front end connected with the worm 16 and its rear end provided with a steering wheel 48 convenient to the operator in the seat 49.

Means are provided whereby two or more tractors may be coupled together side by side including eye members 50 secured to the front ends of the truck frame members 1 and 2, and other members 51 secured to the same members and spaced rearwardly therefrom. 52 represents diagonally disposed spacing bars having their opposite ends detachably connected with the eye members 50 and 51, and 53 represents a transversely disposed bar having its opposite ends detachably connected with arms $54^1$ integral with the worm sector 12. The draft bars 43 are connected by means of a transversely disposed draft member 54 provided with a series of spaced openings 55.

Mechanism whereby the operator may control a movement of the two tractors simultaneously includes two two-part rock shafts 56 and 57 coupled together at their middle by means of separable and angularly adjustable arms 58 and 59 secured to the adjacent ends of the shafts, the arm 58 being provided with a concentric slotted opening that receives a bolt 60 connecting it with the arm 59 whereby the shafts may be adjusted relative to each other about their axes and secured together in adjusted position. The shafts are journaled in fixed bearings 61 secured to the engine, and their opposite ends are provided with depending arms 62 terminating in bearing members 63, in which are journaled forked members 64 that engage the forward and reverse levers near their middles. The arms upon the rock shaft 56 connect with the forward levers 40, and those upon the rock shaft 57 with the reverse levers 39. If it be desired to have three tractors coupled together, supplemental rock shafts 65 may be connected with the shafts 56 and 57 by means of detachable clamps 66 and provided with forked members 67 to engage with the forward and reverse levers of the additional tractors. Supplemental spacing bars $52^1$ may be used to couple the other end of the truck frame with the frame of the adjacent tractor. The draft member 54 will be extended to the draft bar of the third tractor and the supplemental bar $53^1$ used to couple the steering worm sectors together. The operator may occupy either seat, and by disengaging the worm 16 of the other tractor from the steering worm sector by turning its eccentric bearings, he may steer both tractors simultaneously by means of a single steering wheel.

Having shown and described one embodiment of my invention, I do not desire that it be limited to the specific details of its structure as illustrated, it being understood that changes may be made in the form, proportion and organization of its various parts without departing from the spirit of the invention as indicated in the appended claims.

What I claim as my invention, and desire to secure by Letters Patent, is:

1. A plurality of tractor units having, in combination, means whereby they may be flexibly coupled together in side by side relation, a forward and reverse power transmission gear mechanism for each unit, and single means for controlling a plurality of power transmission gear mechanisms simultaneously.

2. A plurality of tractor units having, in combination, means whereby they may be flexibly coupled together in side by side relation, a steering mechanism for each unit, a forward and reverse power transmission gear mechanism for each unit, and means for simultaneously controlling a plurality of steering means and a plurality of power transmission gear mechanisms from one of the units.

3. A plurality of tractor units having forward and reverse power transmission gear mechanism controllable by the operator for placing either gearing in operation, means for flexibly coupling said tractors together in side by side relation, and means for connecting said gear controlling elements in a manner whereby they may be operated simultaneously from either tractor.

4. A plurality of tractor units having forward and reverse power transmission gearing, each including a clutch mechanism, separate means whereby the operator may cause either clutch mechanism to engage, means for flexibly coupling said tractors together in side by side relation, and means for connecting said clutch controlling elements whereby they may be operated simultaneously from a selected tractor unit.

5. A plurality of tractor units having forward and reverse power transmission gearing, each including a clutch mechanism, separate levers for controlling the operation selectively of the clutch mechanisms, means for coupling said tractors together in side by side relation, and rock shafts connecting the corresponding clutch controlling levers of each tractor unit whereby they may be operated simultaneously from a selected unit.

6. A plurality of tractor units having forward and reverse power transmission gearing, each including a clutch mechanism, separate vertically disposed levers for controlling selectively the engagement of either of said clutch mechanisms, means for coupling said tractors together in side by side relation, and separate rock shafts provided with depending arms engaging with the corresponding clutch controlling levers of each tractor unit whereby they may be operated simultaneously from a selected unit.

7. A plurality of tractor units having forward and reverse power transmission gearing, each including a clutch mechanism, separate vertically disposed levers for selectively controlling the operation of the clutch mechanisms, means for coupling said tractor units together in side by side relation, and separate two-part rock shafts provided with depending arms engaging with corresponding clutch controlling levers whereby they may be operated simultaneously from a selected tractor having means for adjusting the two parts of said rock shafts axially relative to each other.

8. A plurality of tractor units having, in combination, means whereby they may be coupled together in side by side relation, a steering mechanism for each unit including a steering axle having a vertically disposed rotatable stem, a worm sector journaled upon said stem and yieldingly connected therewith, a worm journaled in eccentrically mounted bearings and engaging with said sector, means for rotating said bearings in a manner to disengage the worm from said sector, and a link connection between the sector units whereby the operation of a plurality of steering elements may be controlled simultaneously from a selected tractor unit.

9. A plurality of tractor units having, in combination, separate truck frames, axles and draft members, and means for flexibly and detachably coupling said truck frames together with said axles substantially in alinement to propel a load in common through said draft members.

10. A plurality of tractor units having, in combination, separate truck frames, axles and draft members, means for flexibly and detachably coupling said truck frames together with said axles in axial alinement, and a single transverse bar connecting said draft members.

11. In combination, a plurality of motor vehicles each having its own separate power mechanism and separate control means, and means for coupling said motor vehicles in side by side relation and means for coupling said separate control means whereby the power vehicles may be controlled from a common point.

12. A plurality of tractor units having forward and reverse power transmission gear mechanism controllable by the operator for placing either gear mechanism in operation, operating levers for said gear mechanism, means for coupling said tractors together in side by side relation, and means for connecting said operating levers including a shaft hingedly mounted on each tractor and operatively connecting said levers.

13. In combination, a plurality of tractors, each having its own tractor means, steering means and control means which are simultaneously under control of a single operator, means for making all tractors simultaneously operative in side by side relation upon a single draft member, and means for simultaneously controlling all tractors from a common point.

In testimony whereof I affix my signature.

EDWARD W. BURGESS.